(12) United States Patent
Bracha et al.

(10) Patent No.: US 11,167,498 B2
(45) Date of Patent: Nov. 9, 2021

(54) 3D PRINTING NOZZLE CALIBRATION INSIDE A HEATED CHAMBER

(71) Applicant: D. Swarovski KG, Wattens (AT)

(72) Inventors: Arik Bracha, Tel-Aviv (IL); Eran Gal-or, Kfar-Saba (IL)

(73) Assignee: D. Swarovski KG, Wattens (AT)

( * ) Notice: Subject to any disclaimer, the term of this patent is extended or adjusted under 35 U.S.C. 154(b) by 0 days.

(21) Appl. No.: 16/489,549

(22) PCT Filed: Feb. 26, 2018

(86) PCT No.: PCT/IB2018/051181
§ 371 (c)(1),
(2) Date: Aug. 28, 2019

(87) PCT Pub. No.: WO2018/163008
PCT Pub. Date: Sep. 13, 2018

(65) Prior Publication Data
US 2020/0009794 A1 Jan. 9, 2020

Related U.S. Application Data

(60) Provisional application No. 62/467,258, filed on Mar. 6, 2017.

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/227* (2017.08); *B33Y 30/00* (2014.12); *B33Y 50/02* (2014.12)

(58) Field of Classification Search
None
See application file for complete search history.

(56) References Cited

U.S. PATENT DOCUMENTS

2007/0228592 A1 10/2007 Dunn et al.
2010/0100224 A1 4/2010 Comb et al.
(Continued)

FOREIGN PATENT DOCUMENTS

| CN | 204749276 U | 11/2015 |
| CN | 105172133 A | 12/2015 |
| CN | 206287520 U | 6/2017 |

OTHER PUBLICATIONS

Extended European Search Report dated Nov. 20, 2020; European Application No. 18764938.9; European Patent Office; Munich, Germany.
(Continued)

*Primary Examiner* — Yung-Sheng M Tsui
(74) *Attorney, Agent, or Firm* — Stevens & Showalter LLP (57) ABSTRACT

A 3D printing nozzle calibration system, comprising a heated chamber; a printing base plate mounted inside the heated chamber; printing base moving means configured to move the printing base plate; a moving carriage; at least one rail on which the moving carriage is configured to slide up and down; a printing nozzle partially mounted inside the heated chamber; the printing nozzle is connected to the moving carriage; a hard stop connected to the moving carriage; a fixed part on which the hard stop is resting; and a printer controller; wherein the printing base plate is configured to move up, up to a point where the printing base plate touches the printing nozzle in a determined point of the printing base plate, thereby causing the hard stop to disconnect from the fixed part; and wherein the printer controller is configured to store a height of the printing base plate upon the disconnection.

15 Claims, 6 Drawing Sheets

(51) Int. Cl.
*B33Y 50/02* (2015.01)
*B29C 64/227* (2017.01)

(56) References Cited

U.S. PATENT DOCUMENTS

| | | |
|---|---|---|
| 2013/0242317 A1 | 9/2013 | Leavitt et al. |
| 2016/0096329 A1 | 4/2016 | Ko et al. |
| 2016/0271871 A1 | 9/2016 | Lee et al. |
| 2017/0371317 A1* | 12/2017 | Share .................... B29C 64/245 |

OTHER PUBLICATIONS

Orgad Yaniv; International Search Report and Written Opinion; International Application No. PCT/IB2018/051181; dated Jun. 4, 2018; Israel Patent Office; Jerusalem, Israel.
Office Action dated Dec. 8, 2020; Chinese Application No. 201880015250.9; China National Intellectual Property Administration; Beijing, China.

* cited by examiner

3D PRINTING NOZZLE CALIBRATION INSIDE A HEATED CHAMBER

CROSS-REFERENCE TO RELATED PATENT APPLICATIONS

This patent application claims priority from and is related to U.S. Provisional Patent Application Ser. No. 62/467,258, filed Mar. 6, 2017, this U.S. Provisional Patent Application incorporated by reference in its entirety herein.

FIELD OF THE INVENTION

The present invention generally relates to printing systems and specifically to a 3D printing nozzle calibration system.

BACKGROUND 3D printing or Additive Manufacturing (AM), Fuse Depositing Modeling (FDM) and
Fused Filament Fabrication (FFT) refer to any of the various processes for printing a three-dimensional object. Primarily additive processes are used, in which successive layers of material are laid down under computer control. These objects can be of almost any shape or geometry, and are produced from a 3D model or other electronic data source. Different types of 3D printers were developed over the years, such as 3D FDM (Fused Deposition Modeling) extrusion printers. 3D FDM extrusion printers are mostly based on melting a filament, e.g. plastics, in a printer head.

While printing with high melting temperature printing materials, such as, glass, metal, etc., it is desirable to maintain a high temperature in the printing area in order to avoid cracks or breakages due to thermal stresses on the printed part. For that purpose, the printing process has to be performed in a hot environment e.g., inside a heated chamber/furnace.

Height calibration of the printing nozzle relative to the printing base plate is very important, especially for the first layer. If the nozzle (printing head) is placed too close to the printing base plate, the first layer may be very thin and hard to adhere. If the nozzle is placed too far from the printing base plate, the first layer will not adhere at all. The printing base plate is not perfectly flat so it is important to calibrate the nozzle height relative to the printing base plate in a number of points of the printing base plate area.

The Height calibration is much more critical while printing at high temperatures because of the significant thermal expansion.

Existing solution use distance sensor installed near the printing nozzle.

While moving the printing base plate on XY plane to a number of determined points, the base plate moves up and down on Z axis until the distance sensor recognize the printing base plate. Performing this process in a number of determined points enables the printer controller to generate a mapping file of the nozzle's height relative to the printing base plate for the whole printing base plate area.

Since the important value is the distance between the nozzle and the printing base plate (not the distance between the distance sensor and the printing base plate), another measurement is required, the distance between the nozzle and the printing base plate at least at one of the determined points. This measurement may be done manually by moving the nozzle towards the printing base plate. By using this method, there is a risk of damaging the nozzle by crashing it into the printing base plate.

The heated chamber/furnace raises a problem of how to calibrate the nozzle's height while the nozzle's tip is mounted in a very hot environment (e.g., 600 deg C.) inside the heated chamber/furnace where it is impossible to use standard electronic devices/distance sensors, etc.

Therefore, there is a need for a system enabling to calibrate the height of a printing nozzle while the nozzle's tip is mounted in a hot (or very hot) environment.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a system for calibrating a 3D printing nozzle while the nozzle's tip is mounted in a hot (or very hot) environment (e.g., 600 deg C.). Throughout the description, 3D printing materials printed inside a heated chamber, such as, glass, metal or any other printing material requiring high melting temperature may be referred to as printing material(s).

It will be appreciated that the calibration process of the present invention is performed in a system printing using a fixed printing head/nozzle and a moving printing base plate, but this process may also be performed similarly in a system printing using a moving printing head/nozzle and a fixed printing base plate or any other combination of a moving printing nozzle and a moving printing base plate.

It will be appreciated that the terms "fixed printing nozzle" and "fixed printing base plate" are related to the printing process. During calibration the printing nozzle and/or the printing base plate may be fixed or not.

Figure 1:
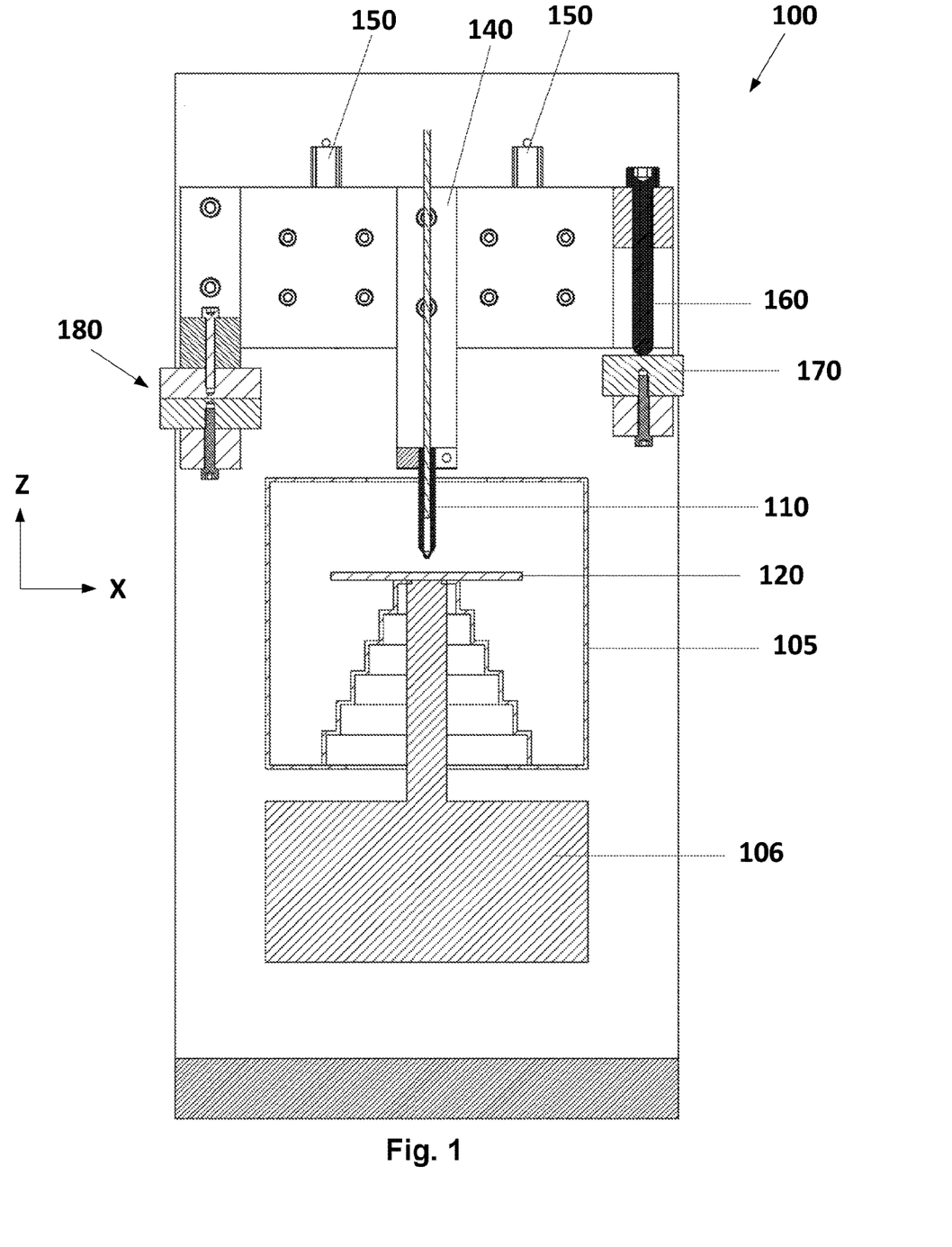
FIG. 1 is a schematic view of a 3D printing nozzle calibration system, printing using a fixed printing head/nozzle and a moving printing base plate according to embodiments of the present invention.

FIG. 1 is a schematic view of a 3D printing nozzle calibration system 100, printing using a fixed printing head/nozzle and a moving printing base plate, according to embodiments of the present invention, comprising: a heated chamber/furnace 105, a printing head (nozzle) 110 partially mounted inside the heated chamber 105, a moving substrate/printing base plate 120 mounted inside the heated chamber 105, moving means 106 for moving the printing base plate 120 in the XYZ planes, a moving carriage 140 to which the printing nozzle 110 is connected, at least one linear guide rail 150 (two are shown) on which the moving carriage 140 is sliding up and down, a hard stop 160 connected to the moving carriage 140, a fixed part 170, defining the nozzle's tip position (the working position), on which the hard stop 160 is resting, and a printer controller (not shown).

The upper side of the nozzle 110 is mounted outside the heated chamber 105 and the lower side (the nozzle's tip) is mounted inside the heated chamber 105. The nozzle 110 is connected to the moving carriage 140 which is mounted outside the heated chamber 105. The carriage 140 slides on at least one linear guide rail 150, parallel to "Z" axis, and enables the nozzle 110 to move up if exposed to a vertical pushing force. The hard stop 160 connected to the carriage 140 rests against the fixed part 170 and defines the nozzle's tip position (the working position).

According to embodiments of the present invention, the hard stop 160 is connected to one polarity of a simple electric circuit and the fixed part 170 is connected to the other polarity of the same electric circuit. As long as the hard stop rests against the fixed part 170, the electric circuit is closed, namely, the nozzle's tip is at the lower position—working position. When the nozzle moves up, the hard stop 160 disconnects from the fixed part 170 and the electric circuit is opened. When the disconnection happens, the electric circuit sends a signal to the printer controller to record the exact height of the printing base plate.

Figure 1A:
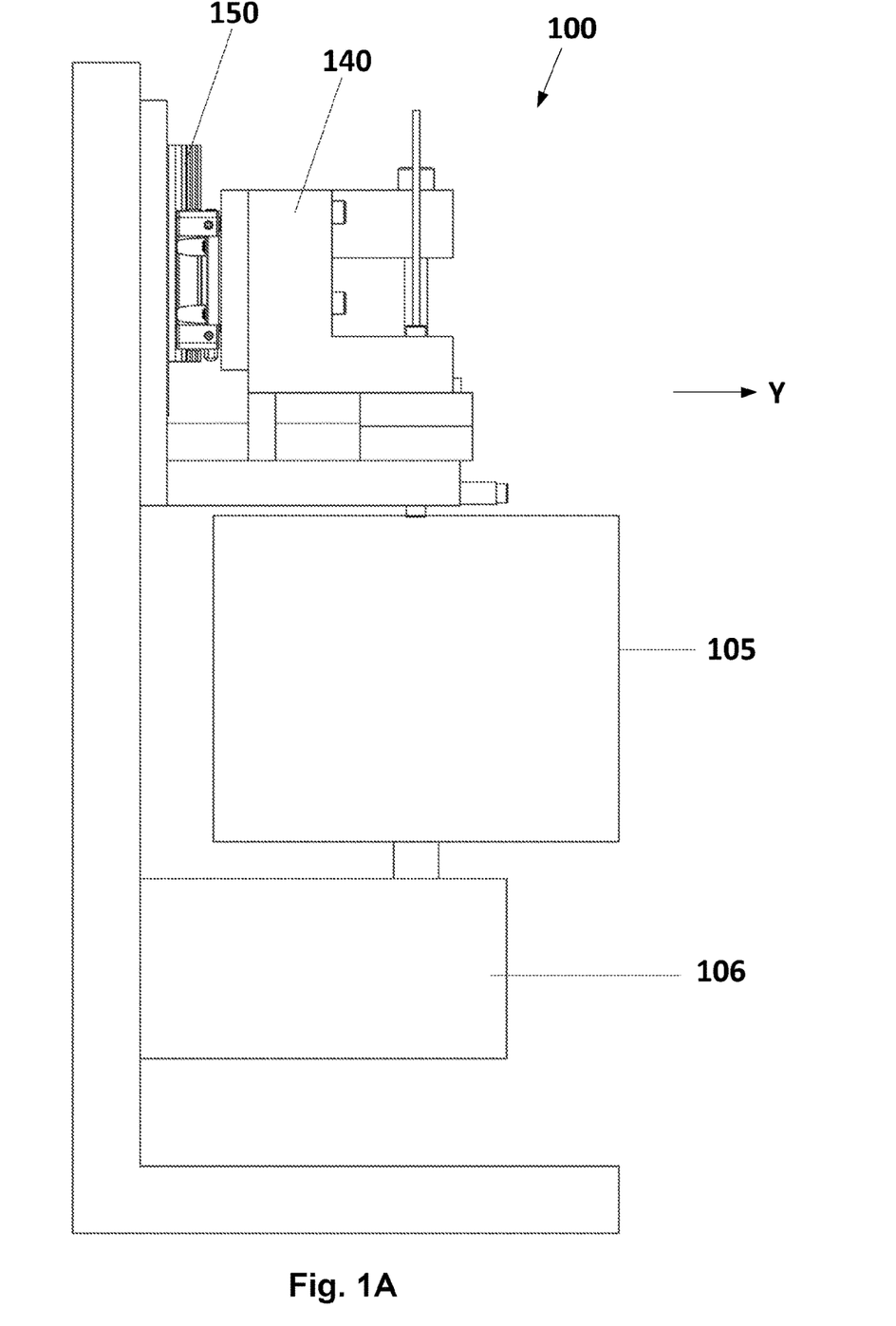
FIG. 1A is a schematic side view of the 3D printing nozzle calibration system of FIG. 1.

FIG. 1A is a schematic side view of the 3D printing nozzle calibration system 100 of FIG. 1.

Figure 2:
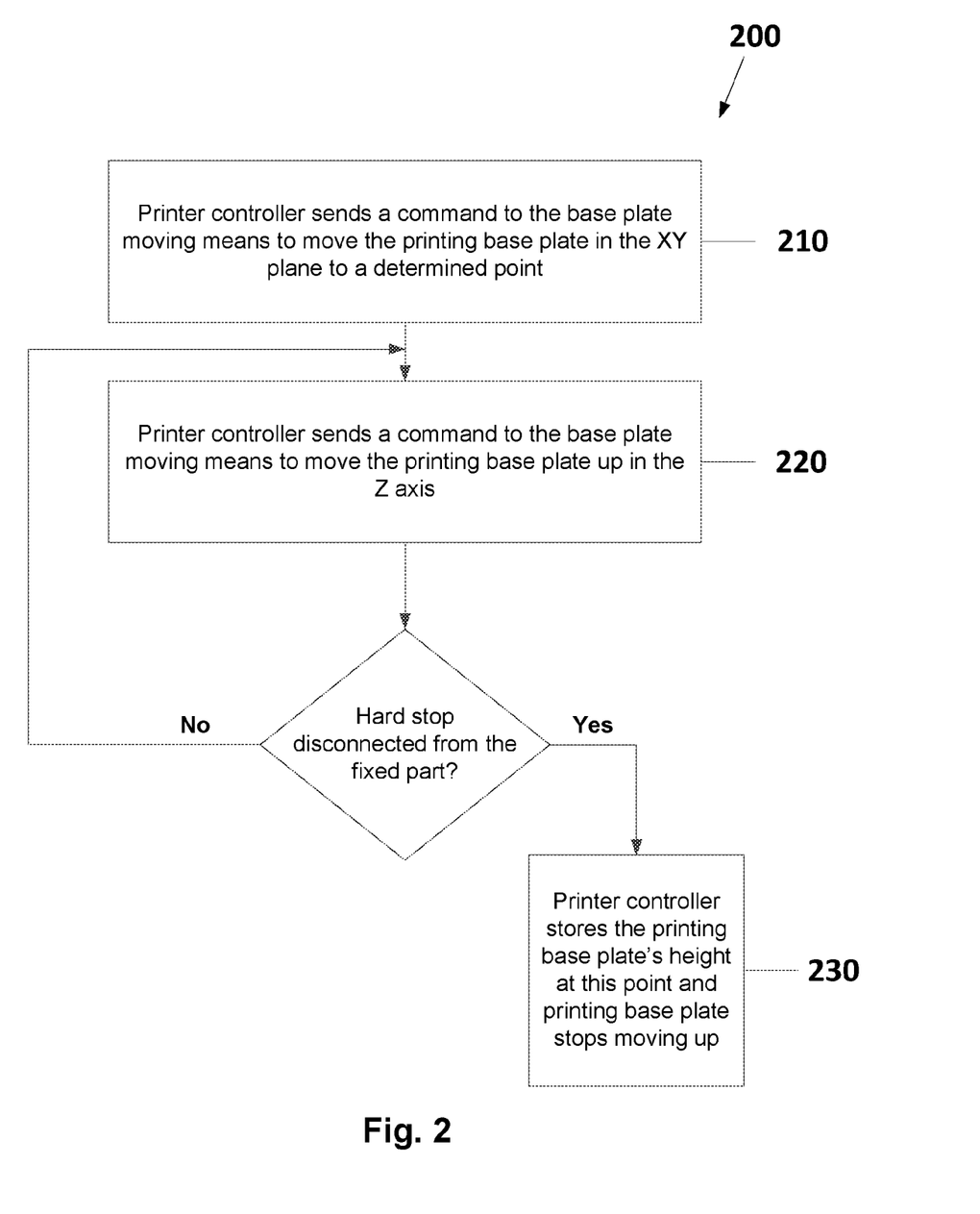
FIG. 2 is a flowchart showing the nozzle's calibration process performed by the system of FIG. 1 according to embodiments of the present invention.

FIG. 2 is a flowchart 200 showing the nozzle's calibration process performed by the system 100 according to embodiments of the present invention. In step 210, the printer controller sends a command to the printing base plate moving means to move the printing base plate 120 in the XY plane to a determined point. In step 220, when the printing base plate is at the determined point, the printer controller sends a command to the printing base plate moving means to move the printing base plate 120 up in the Z axis. When the nozzle's tip touches the printing base plate, the nozzle 110 is pushed up by the printing base plate and the hard stop 160, which is connected to the same moving carriage as the nozzle 110, also moves up and disconnects from the fixed part 170. In step 230, due to the disconnection, the electric circuit is opened, sends a signal to the printer controller to record the printing base plate's height and the controller sends a signal to the printing base plate moving means to stop moving up. This Z height parameter is stored in the printer controller.

It will be appreciated that this process may be repeated as desired, in a number of determined points, in order to create a mapping file of the distances between the printing base plate and the nozzle's tip at each one of the determined points of the printing base plate.

It will be appreciated that the system 100 may include, instead of the electric circuit, a load cell as the fixed part on which the hard stop is resting. In such a case, the printer controller measures the force made on the load cell and detects degradation of the force when the printing base plate touches the nozzle's tip.

It will be appreciated that other solutions such as a distance sensor, a capacitive base sensor, an IR sensor, laser based sensor, etc. may also be used instead of the electric circuit to detect the disconnection of the hard stop 160 from the fixed part 170.

As mentioned before, the hard stop defines the nozzle's tip lower position (working position). Sometimes during printing, a retraction of the printing material is required. The retraction involves a force that may pull the nozzle up, if the nozzle is free to move up on its carriage. According to embodiments of the present invention, in order to prevent that movement, during printing (not during height calibration), an electromagnet (e.g.

180 of FIG. 1) or any other type of locking mechanism which can prevent this movement, may be used in order to keep the nozzle's tip locked at working position (e.g., mechanical). In some cases, the electromagnet may be the fixed part (170 of FIG. 1) on which the hard stop is resting. In such a case, the hard stop should be formed from a magnetic material (ferromagnetic).

According to embodiments of the present invention, a cleaning station may be used before or during the calibration in order to prevent cases where molten material which stuck to the nozzle's tip causes the height measurement to be inaccurate.

According to embodiments of the present invention, the height calibration process may be performed on a non-planar printing base plate or surface. Since the process may be repeated as desired, a comprehensive mapping file may be generated by calibrating in a large number of points. According to the mapping file, the printer controller may send Z axis corrections to the printing base plate while printing.

As mentioned above, the described calibration process may be performed in a system printing with a fixed printing head/nozzle and a moving printing base plate and in a system printing with a moving printing head/nozzle and a fixed printing base plate or any other combination of a moving printing nozzle and a moving printing base plate.

Figure 3:
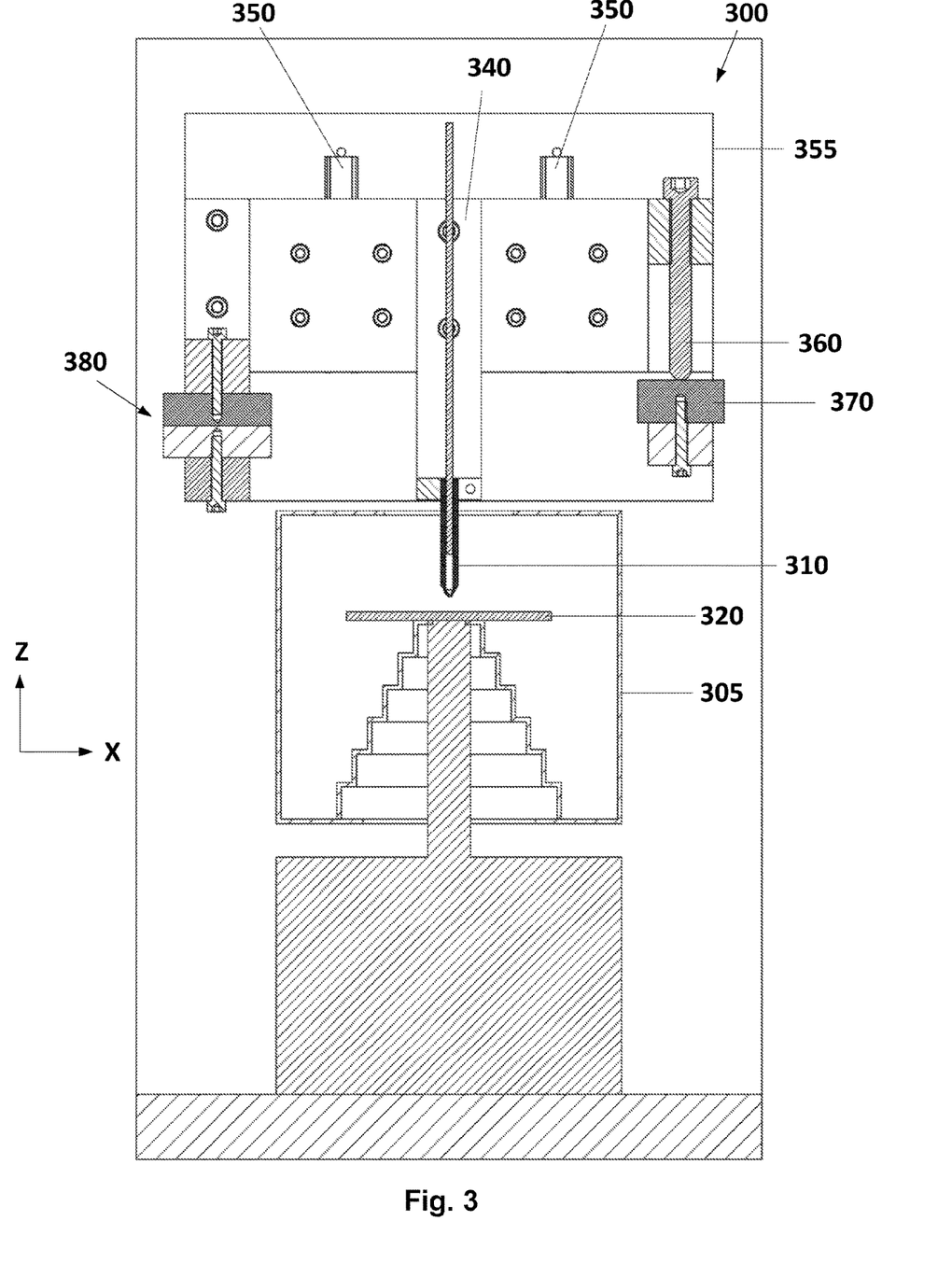
FIG. 3 is a schematic view of a 3D printing nozzle calibration system, printing with a moving printing head/nozzle and a fixed base plate, according to embodiments of the present invention.

FIG. 3 is a schematic view of a 3D printing nozzle calibration system 300, printing with a moving printing head/nozzle and a fixed printing base plate, according to embodiments of the present invention, comprising: a heated chamber/furnace 305, a moving printing head (nozzle) 310 partially mounted inside the heated chamber, a substrate/printing base plate 320 mounted inside the heated chamber, a moving carriage 340 to which the printing nozzle 310 is connected, at least one linear guide rail 350 on which the moving carriage is sliding up and down (two are shown), a board 355 on which the at least one linear guide rail 350 is mounted, a hard stop 360 connected to the moving carriage 340, a resting part 370 connected to the board 355, defining the nozzle's tip position (the working position), on which the hard stop 360 is resting, a printer controller (not shown) and moving means (365 of FIG. 3A) for moving the board 355 in the XYZ planes along with the printing nozzle 310, the carriage 340, the hard stop 360, the at least one linear guide rail 350 and the resting part 370.

As mentioned before, the hard stop defines the nozzle's tip lower position (working position). Sometimes during printing, a retraction of the printing material is required. The retraction involves a force that may pull the nozzle up, if the nozzle is free to move up on its carriage. According to embodiments of the present invention, in order to prevent that movement, during printing (not during height calibration), an electromagnet (e.g. 380 of FIG. 3) or any other type of locking mechanism which can prevent this movement, may be used in order to keep the nozzle's tip locked at its current working position (e.g., mechanical). In some cases, the electromagnet may be the resting part (370 of FIG. 3) on which the hard stop is resting. In such a case, the hard stop should be formed from a magnetic material (ferromagnetic).

Figure 3A:
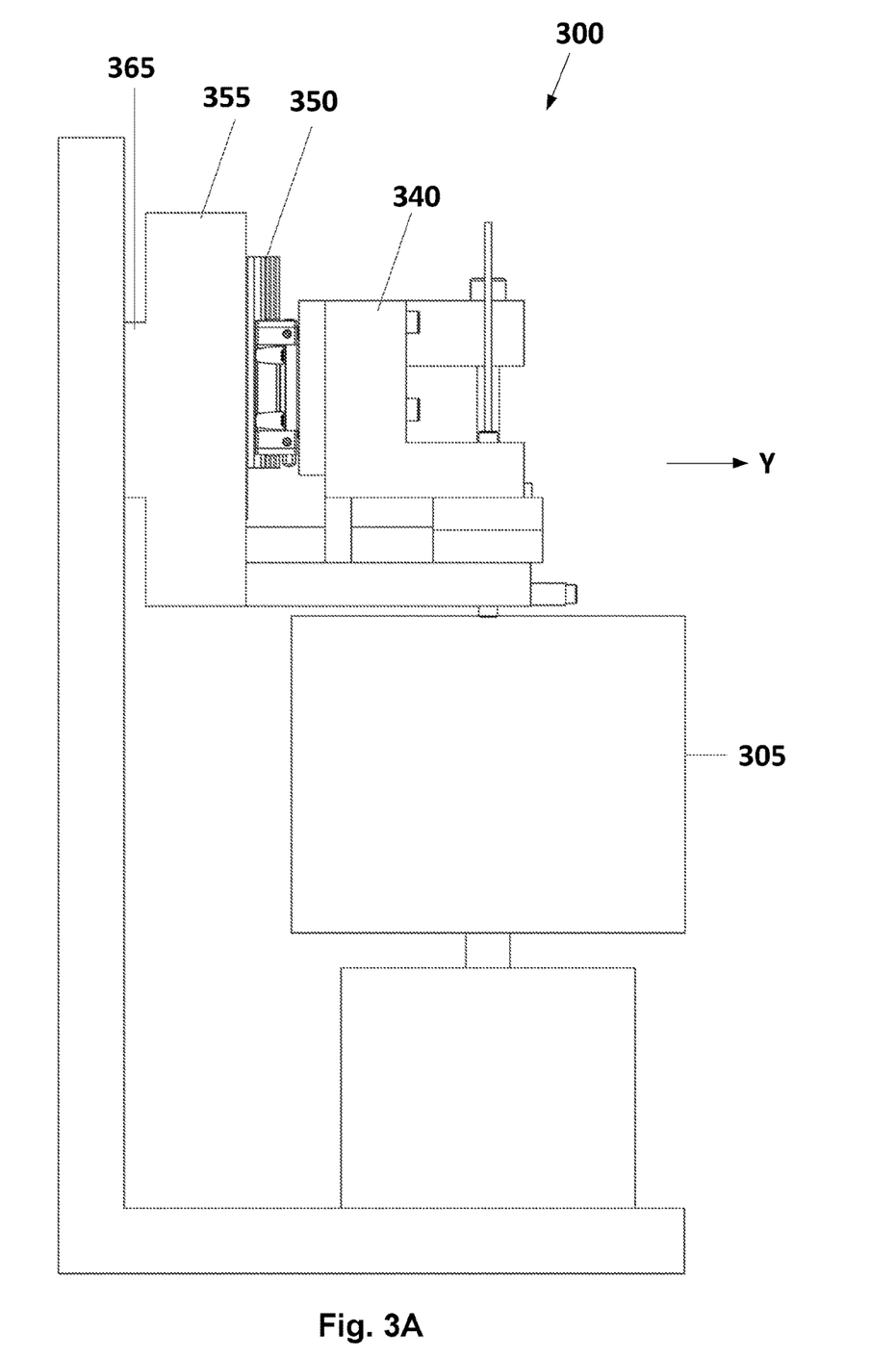
FIG. 3A is a schematic side view of the 3D printing nozzle calibration system of FIG. 3.

FIG. 3A is a schematic side view of the 3D printing nozzle calibration system 300 of FIG. 3.

Figure 4:
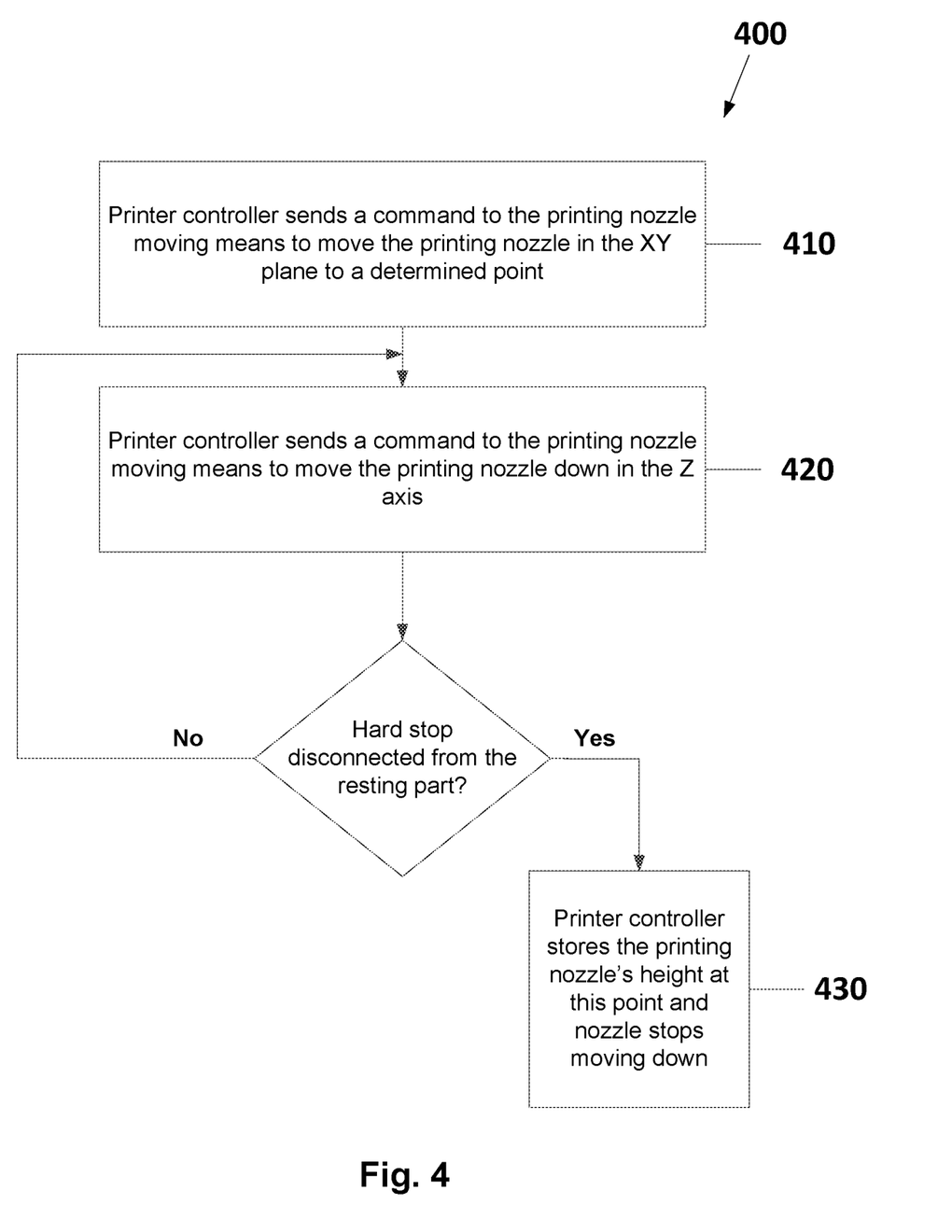
FIG. 4 is a flowchart showing the nozzle's calibration process performed by the system of FIG. 3 according to embodiments of the present invention.

FIG. 4 is a flowchart 400 showing the nozzle's calibration process performed by the system 300 according to embodiments of the present invention. In step 410, the printer controller sends a command to the printing nozzle moving means to move the printing nozzle in the XY plane to a determined point. In step 420, when the printing nozzle is at the determined point, the printer controller sends a command to the printing nozzle moving means to move the printing nozzle down in the Z axis. When the nozzle's tip touches the printing base plate, the nozzle is pushed up by the printing base plate and the hard stop, which is connected to the same moving carriage as the nozzle, also moves up and disconnects from the resting part. In step 430, due to the disconnection, the electric circuit is opened, sends a signal to the printer controller to record the nozzle's height and the controller sends a signal to the printing nozzle moving means to stop moving up. This Z height parameter is stored in the printer controller.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A 3D printing nozzle calibration system, comprising:
a heated chamber capable of reaching a temperature of at least about 600° C.;
a printing base plate mounted inside said heated chamber and capable of moving move said printing base plate;
a moving carriage;
at least one rail on which said moving carriage is capable of sliding up and down;
a printing nozzle mounted inside said heated chamber and mounted to said moving carriage;
a hard stop connected to said moving carriage;
a fixed part on which said hard stop is resting;
an electric circuit, wherein said hard stop is connected to one polarity of the electric circuit and said fixed part is connected to an other polarity of the electric circuit;
a printer controller comprising programming instructions that when executed by the printer controller cause said printing base plate to move up to a point where said printing base plate touches said printing nozzle in a determined point of said printing base plate, thereby causing said hard stop to disconnect from said fixed part and said circuit to open; and
wherein when said electric circuit is opened said electric circuit sends a signal to said printer controller to record an exact height of said printing base plate upon said disconnection.

2. The 3D printing nozzle calibration system of claim 1, further comprising a locking mechanism capable of locking said printing nozzle while printing.

3. The 3D printing nozzle calibration system of claim 2, wherein said locking mechanism comprises an electromagnet or a mechanical locking.

4. The 3D printing nozzle calibration system of claim 1, wherein said printing base plate is a non-planar printing base plate.

5. The 3D printing nozzle calibration system of claim 1, wherein said printing base plate is capable of moving in X, Y and Z planes.

6. A 3D printing nozzle calibration system, comprising:
a heated chamber capable of reaching a temperature of at least about 600° C.;
a printing base plate mounted inside said heated chamber and capable of moving;
a moving carriage;
at least one rail on which said moving carriage is capable of sliding up and down;
a printing nozzle mounted inside said heated chamber and mounted to said moving carriage;
a hard stop connected to said moving carriage
a fixed part on which said hard stop is resting, wherein said fixed part is a load cell; and
a printer controller comprising programming instructions that when executed by the printer controller cause said printing base plate to move up to a point where said printing base plate touches said printing nozzle in a determined point of said printing base plate, thereby causing said hard stop to disconnect from said load cell; and
wherein said printer controller is capable of measuring a force made on said load cell and to detect degradation of said force when said printing base plate touches said printing nozzle's tip and to record an exact height of the printing base plate.

7. The 3D printing nozzle calibration system of claim 6, further comprising a locking mechanism capable of locking said printing nozzle while printing.

8. The 3D printing nozzle calibration system of claim 7, wherein said locking mechanism comprises one of an electromagnet or a mechanical locking.

9. The 3D printing nozzle calibration system of claim 6, wherein said printing base plate is a non-planar printing base plate.

10. The 3D printing nozzle calibration system of claim 6, wherein said printing base plate is capable of moving in X, Y and Z planes.

11. A 3D printing nozzle calibration system, comprising:
a heated chamber capable of reaching a temperature of at least about 600° C.;
a printing base plate mounted inside said heated chamber and capable of moving;
a moving carriage;
at least one rail on which said moving carriage is capable of sliding up and down;

a printing nozzle mounted inside said heated chamber and mounted to said moving carriage;

a hard stop connected to said moving carriage a fixed part on which said hard stop is resting; and a printer controller comprising programming instructions that when executed by the printer controller cause said printing base plate to move up to a point where said printing base plate touches said printing nozzle in a determined point of said printing base plate, thereby causing said hard stop to disconnect from said fixed part; and wherein said disconnection is detected by a distance sensor, a capacitive base sensor, an IR sensor or a laser based sensor, and wherein said printer controller records bean exact height of the printing base plate at said disconnection.

12. The 3D printing nozzle calibration system of claim 11, further comprising a locking mechanism capable of locking said printing nozzle while printing.

13. The 3D printing nozzle calibration system of claim 12, wherein said locking mechanism comprises one of an electromagnet or a mechanical locking.

14. The 3D printing nozzle calibration system of claim 11, wherein said printing base plate is a non-planar printing base plate.

15. The 3D printing nozzle calibration system of claim 11, wherein said printing base plate is capable of moving in X, Y and Z planes.

* * * * *